(12) United States Patent
Ettridge et al.

(10) Patent No.: US 11,391,084 B2
(45) Date of Patent: Jul. 19, 2022

(54) BARRIER WINDOW SPACER WITH ENHANCED DURABILITY

(71) Applicant: AMCOR FLEXIBLES DENMARK APS, Horsens (DK)

(72) Inventors: Peter Ettridge, Worcester (GB); Paul Schlemmer, Egaa (DK); Galina Ourieva, Amougies (BE)

(73) Assignee: Amcor Flexibles Denmark APS, Horsens (DK)

( * ) Notice: Subject to any disclaimer, the term of this patent is extended or adjusted under 35 U.S.C. 154(b) by 55 days.

(21) Appl. No.: 16/959,597

(22) PCT Filed: Dec. 18, 2018

(86) PCT No.: PCT/EP2018/085631
§ 371 (c)(1),
(2) Date: Jul. 1, 2020

(87) PCT Pub. No.: WO2019/134825
PCT Pub. Date: Jul. 11, 2019

(65) Prior Publication Data
US 2020/0340292 A1    Oct. 29, 2020

(30) Foreign Application Priority Data
Jan. 2, 2018    (EP) .................................. 18150078

(51) Int. Cl.
*E06B 3/663*   (2006.01)
*B32B 7/12*    (2006.01)
(Continued)

(52) U.S. Cl.
CPC ............ *E06B 3/66328* (2013.01); *B32B 7/12* (2013.01); *B32B 27/08* (2013.01); *B32B 27/306* (2013.01);
(Continued)

(58) Field of Classification Search
None
See application file for complete search history.

(56) References Cited

U.S. PATENT DOCUMENTS 7,641,965 B1 * 1/2010 Bennison .......... B32B 17/10743
428/215
9,260,906 B2  2/2016 Schreiber
(Continued)

FOREIGN PATENT DOCUMENTS

EP    0154428 A2    2/1985
EP    0430889 A2    6/1991
(Continued)

OTHER PUBLICATIONS

Mar. 5, 2019, International Search Report and Written Opinion of the International Searching Authority from the European Receiving Office, in PCT/EP2018/085631, which is an international application corresponding to this U.S. application.

*Primary Examiner* — Chinessa T. Golden (57) ABSTRACT

A window spacer may include a spacer substrate having two pane contact surfaces, an adhesive surface, and a glazing interior surface. A multilayer barrier film is in contact with the adhesive surface of the spacer substrate. The multilayer barrier film includes at least two first polymeric layers and at least two inorganic layers. The inorganic layers are separated by a second polymeric layer. The second polymeric layer has a thickness lower than 5 μm, preferably lower than 4 μm, more preferably having a thickness between 1 μm and 4 μm.

20 Claims, 8 Drawing Sheets

(51) Int. Cl.
 *B32B 27/08* (2006.01)
 *B32B 27/30* (2006.01)
 *B32B 27/32* (2006.01)
 *B32B 27/36* (2006.01)
(52) U.S. Cl.
 CPC .............. *B32B 27/32* (2013.01); *B32B 27/36* (2013.01); *E06B 3/66333* (2013.01); *B32B 2255/10* (2013.01); *B32B 2255/20* (2013.01); *E06B 2003/66338* (2013.01)

(56) References Cited

U.S. PATENT DOCUMENTS

2014/0311065 A1* 10/2014 Schreiber ............ E06B 3/66304
 52/204.593
2015/0251384 A1* 9/2015 Bennison ............ B32B 37/1009
 428/339

FOREIGN PATENT DOCUMENTS

| EP | 2218862 | A2 |   | 2/2010 | |
|----|---------|----|---|--------|---|
| EP | 2719533 | A1 |   | 4/2014 | |
| EP | 3241972 | A1 |   | 8/2017 | |
| EP | 3241972 | A1 | * | 11/2017 | ......... E06B 3/66328 |
| WO | 2013104507 | A1 |   | 7/2013 | |

* cited by examiner

BARRIER WINDOW SPACER WITH ENHANCED DURABILITY

FIELD

The present disclosure is related to a barrier window spacer with enhanced durability. More particularly, in the window spacer of the present disclosure, a barrier film is used having enhanced barrier and insulation properties.

INTRODUCTION

Multiply-glazed windows are well known in the art. Such windows consist of at least two glazing panes, which are arranged in parallel and spaced apart by window spacers (also called spacers or spacer bars). An intermediate space filled with air or gas as insulation medium is produced between the glazing panes.

The spacers are generally arranged along the window frame. The spacers generally have a cavity to receive a drying agent. This drying agent is used to absorb the residual moisture located in the intermediate space of the panes. For this purpose, the spacers can have certain openings or slots toward the intermediate space of the panes so the moisture can reach the cavities of the spacers filled with drying agent.

The spacers are typically configured in such a way that they prevent the penetration of moisture from the frame into the intermediate space of the panes. Moreover, in order to ensure an adequate barrier effect, in the art, a barrier film is at least partially applied to the external sides of the spacers. This relates in particular to the sides directed towards the window frame and some of the side faces of the spacers. This is for example disclosed in EP 2 218 862.

Spacers used in the art typically comprise barrier layers at least partially separated by polymer films. This separation reduces the effectiveness of the barrier performance.

Moreover, if the barrier films used in the art are welded or glued during the assembly of the insulating glazing unit onto the spacer profiles, the barrier film is exposed to high mechanical stresses. Owing to the longitudinal expansion of the barrier films, their barrier effect is often greatly reduced here. Even if during the production of the insulating glass, flexible spacers are applied to the panes by means of robots, the spacer profiles and the barrier films are exposed to high tensile stresses.

In the art, there is thus an issue in providing window spacers comprising a barrier film with excellent barrier properties, i.e. having low permeability to gases and moisture and being robust to elongation and flexing as well.

EP 2 802 726 (or corresponding U.S. Pat. No. 9,260,906) for example discloses a spacer for a multipane insulating glazing unit comprising at least a composite composed of:

a. a glass-fiber-reinforced, polymeric main body comprising two pane contact surfaces running parallel to each other, an adhesive surface and a glazing interior surface, wherein the pane contact surfaces and the adhesive surface are bonded to each other directly or via bonding surfaces, b. an insulation film on the adhesive surface or the adhesive surface and the bonding surfaces, wherein the insulation film comprises at least one polymeric film and wherein the insulation film is structured multilayered with metallic layers and/or ceramic layers, characterized in that the at least one polymeric film has a thickness of 10 µm to 100 µm, and that the insulation film additionally comprises at least one polymeric layer having a thickness of 5 µm to 80 µm, at least two metallic layers having a thickness of each layer of 10 nm to 1500 nm, and/or at least two ceramic layers having a thickness of each layer of 10 nm to 1500 nm, wherein the at least two metallic layers and/or the at least two ceramic layers are arranged alternatingly with the at least one polymeric layer. The spacer enables improved long-term insulating action and, at the same time, simple assembly.

EP 0 430 889 discloses a multiple insulating glazing comprising two panes of glass, which are kept at a distance from each other by a hollow, self-contained spacer profile. The hollow space is filled with a drying agent. The spacer profile consists of glass-fiber-reinforced polycarbonate as heat-insulating material. The inner wall of the spacer profile which encloses an inner space is permeable to water vapour by virtue of a plurality of holes connecting the inner space to the hollow space. The outer wall opposite the inner wall is impermeable to water vapour and gas by virtue of a sputtered-on layer, the sputtered-on material and its layer thickness being chosen such that the heat transfer of the spacer profile is not significantly increased (i.e. the heat transfer through the outer wall is approximately the same as the heat transfer through the uncoated inner wall).

EP 0 154 428 discloses a flexible plastic film laminate comprising two layers of thermoplastic film directly joined together face-to-face by a layer of adhesive, wherein each film is metallized on at least one face and at least one of the films consists of polyolefin, the other said film being polyolefin, cellulose or polyamide. The laminate exhibits high gas and moisture barrier properties and is especially useful as a packaging material for oxygen and/or water vapour-sensitive materials. The laminates can also be used for the construction of insulating elements for buildings, for example for surfacing or encapsulating fiber glass or foamed panels for prefabricated walls, ceilings or floors. In addition to preventing uptake of moisture by the elements, the laminates also serve to reduce radiant heat losses from the surface of the elements.

SUMMARY

The present disclosure aims to provide a barrier window spacer with enhanced durability, more particularly, a window spacer with enhanced barrier performance and insulation properties.

The present disclosure further aims to provide window spacers comprising a barrier film, said film being able to maintain its barrier properties even after submission of a laminate of the film to mechanical constraints such as elongation, folding or flexing.

The present teachings disclose a window spacer comprising:
  a spacer substrate (1) comprising two pane contact surfaces (2,3), an adhesive surface (4) and a glazing interior surface (5);
  a multilayer barrier film (6) being in contact with the adhesive surface (4) of the spacer substrate (1), wherein said multilayer barrier film (6) comprises:
  at least two first polymeric layers (12,22) and
  at least two inorganic layers (13,23), said inorganic layers being separated by a second polymeric layer (14), said second polymeric layer having a thickness lower than 5 µm, preferably lower than 4 µm, more preferably having a thickness between 1 µm and 4 µm.

Preferred embodiments of the present invention disclose at least one, or an appropriate combination of the following features:

the multilayer barrier film comprises at least three inorganic layers (13,23,33), said inorganic layers being separated by a second polymeric layer (24);

the multilayer barrier film comprises at least three first polymeric layers (12,22,32);

the inorganic layers are sandwiched between two of the first polymeric layers;

a second polymeric layer (34) is sandwiched between two of the first polymeric layers;

the first polymeric layer comprises one or more (co)polymers selected from the group consisting of oriented polyethylene terephtalate (oPET), oriented polypropylene (oPP), oriented polyamide (oPA), high-density polyethylene (HDPE), cyclic olefin copolymer (COC), polyethylene naphthalate (PEN), cyclic olefin polymer (COP), and polyethylene furanoate (PEF);

the first polymeric layer comprises up to 25% of nanoclay;

the second polymeric layer is an adhesive layer, or a barrier layer;

the second polymeric layer is an adhesive layer comprising one or more (co)polymers selected from the group consisting of polyurethane, polyurethane comprising nanoclay, fluorinated polyurethane, poly(meth)acrylate, polyvinyl butyral (PVB), polybutylene, polyvinylchloride (PVC), polyvinylfluoride (PVF), polyester, and epoxy resins;

the second polymeric layer is a barrier layer comprising one or more (co)polymers selected from the group consisting of poly(ethylene vinyl alcohol) (EVOH), polyvinyl alcohol (PVOH), polysiloxane ormocer, polyurethane, and fluorinated polyurethane elastomer;

the spacer substrate is a glass fiber reinforced, or foamed spacer substrate;

the inorganic layer comprises a metal layer, preferably aluminium; or a ceramic layer, preferably AlOx or SiOx, more preferably SiOx;

the multilayer barrier film comprises a primer layer (16);

the primer layer positioned on the barrier film comprises one or more (co)polymers selected from the group consisting of (poly)silane, polyurethane, poly(meth)acrylate, polyvinylidene chloride (PVdC), polyvinylchloride (PVC), and epoxy resin;

encapsulant (11) is bonded to the barrier film via the primer layer positioned on said barrier film;

an encapsulant is applied as an adhesive band at least partially on the pane contact surfaces of the spacer;

the encapsulant comprises butyl-containing polymers or copolymers, polysulfide, polyurethane, or silicone;

the multilayer barrier film is bonded on the adhesive surface of the spacer substrate via a polyurethane adhesive, a pressure-sensitive adhesive (PSA), or a heat adhesive;

in the multilayer barrier film (6):
the first polymeric layer (12,22,32) is oPET or oPP;
the inorganic layer (13,23,33) is an aluminium (metal) layer or a SiOx layer; and
the second polymeric layer (14,24,34) is a poly(meth)acrylic based adhesive, an EVOH barrier layer, a PVOH barrier layer, polyurethane, or a polysiloxane ormocer barrier layer;

in the multilayer barrier film (6):
the first polymeric layer (12,22,32) is oPET or oPP;
the inorganic layer (13,23,33) is an aluminium (metal) layer or a SiOx layer; and
the second polymeric layer (14,24,34) is a poly(meth)acrylic based adhesive or an EVOH barrier layer;

in the multilayer barrier film (6):
the first polymeric layer (12,22,32) is oPET;
the inorganic layer (13,23,33) is an aluminium (metal) layer; and
the second polymeric layer (14,24,34) is a poly(meth)acrylic based adhesive.

SHORT DESCRIPTION OF THE DRAWINGS

Embodiments of aspects of the invention will now be described in more detail with reference to the appended drawings, wherein same reference numerals illustrate same features.

(1) spacer substrate
(2,3) pane contact surfaces
(4) adhesive surface
(5) glazing interior surface
(6) multilayer barrier film
(7,8) glazing panes
(9) bottom window frame
(10) interior space
(11) encapsulant
(12,22,32) first polymeric layer
(13,23,33) inorganic barrier layer
(14,24,34) second polymeric layer
(16) primer
(17) adhesive FIG. 1A schematically represents a cross-section of a double glazed window with window spacer and barrier film according to the present disclosure: showing orientation of the barrier film and spacer.

DETAILED DESCRIPTION

According to an aspect of the present disclosure, there is provided a window spacer with enhanced barrier performance and insulation properties, as set out in the appended claims.

Figure 1A:
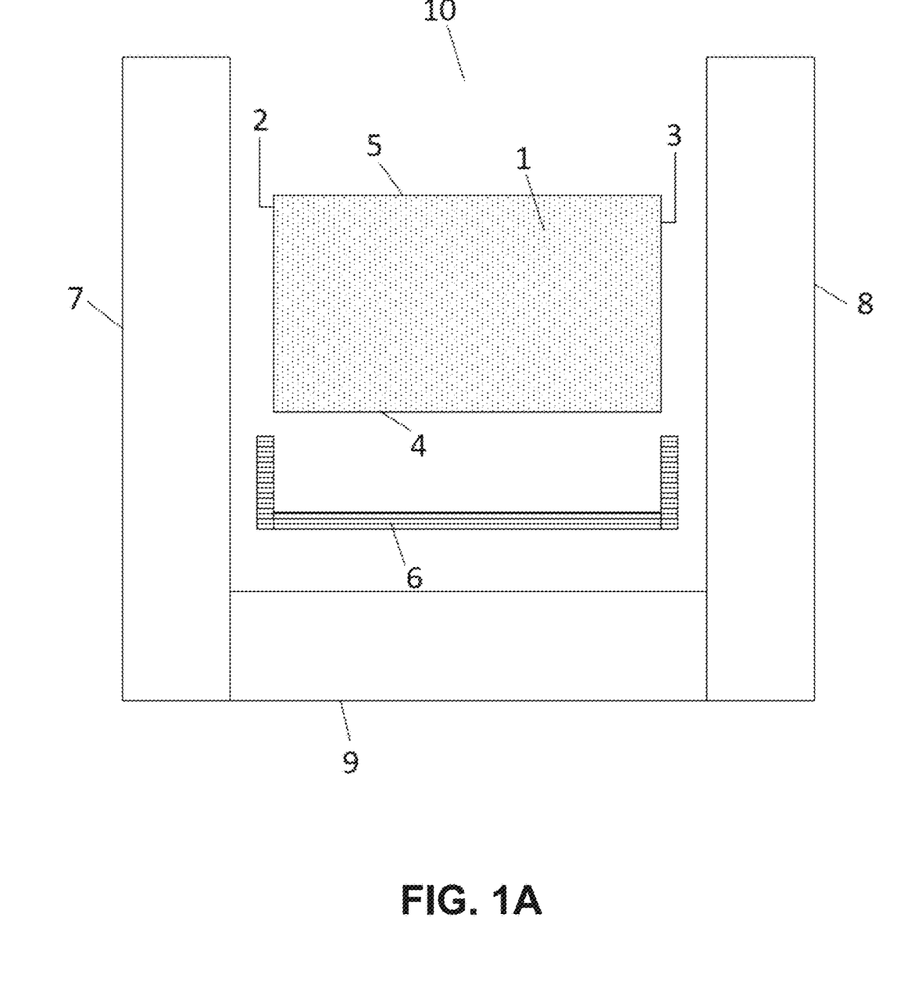
Figure 1B:
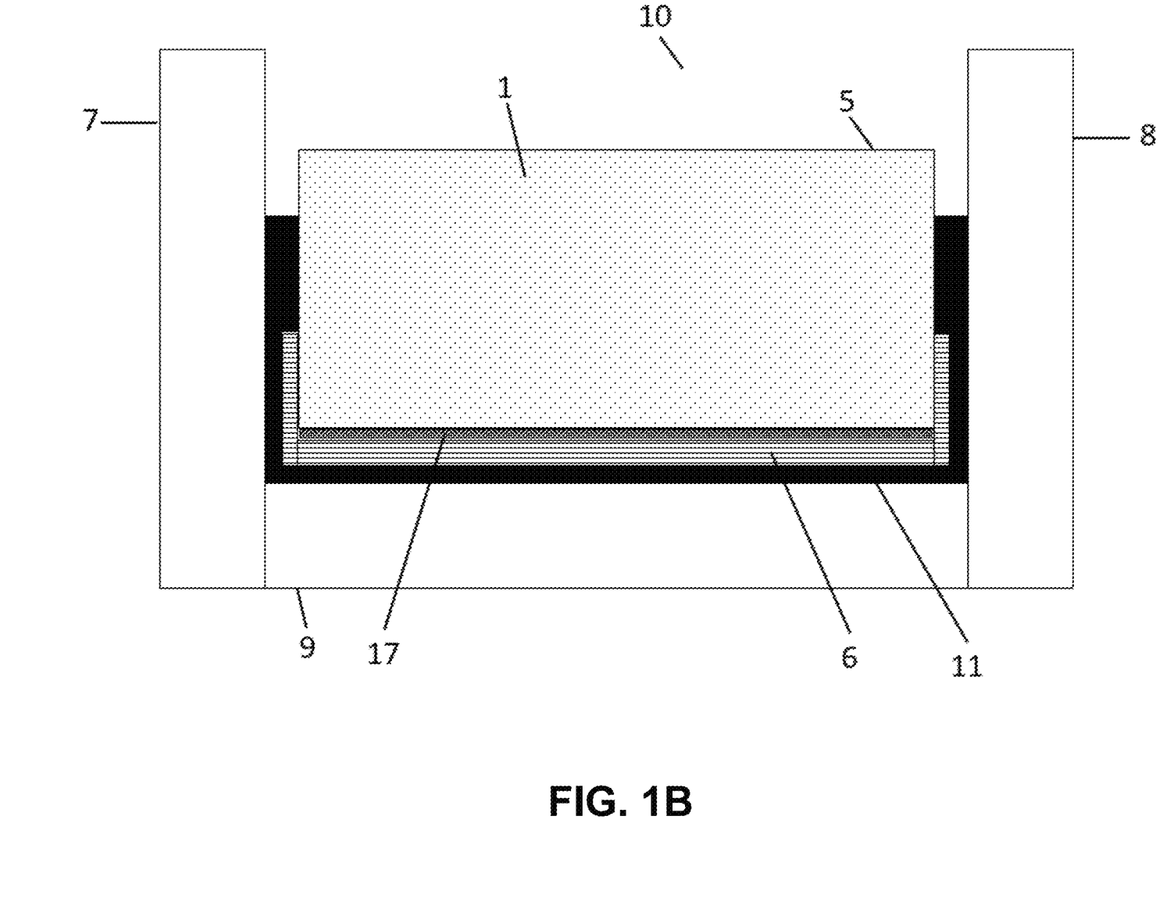
FIG. 1B schematically represents a cross-section of a double glazed window with window spacer and barrier film according to the present disclosure: showing encapsulant, and use of an adhesive between barrier film and spacer.

A cross-section of a double-glazed window using a window spacer with barrier film (or insulation film) according to the present disclosure is shown in FIGS. 1A and 1B.

Sequences of layers of multilayer barrier films used in window spacers according to embodiments of the present disclosure are shown in FIG. 2A to 2D.

In aspects of the present disclosure, a window spacer is provided with a multilayer barrier film adhered onto it.

More particularly, a window spacer is provided, said spacer comprising:

- a spacer substrate (1) comprising two pane contact surfaces (2,3), an adhesive surface (4) and a glazing interior surface (5);
- a multilayer barrier film (6) being in contact with the adhesive surface (4) of the spacer substrate (1), wherein said multilayer barrier film (6) comprises:
  - at least two first polymeric layers (12,22) and
  - at least two inorganic layers (13,23), said inorganic layers being separated by a second polymeric layer (14), said second polymeric layer having a thickness lower than 5 µm, preferably lower than 4 µm, more preferably having a thickness between 1 µm and 4 µm.

Figure 2A:
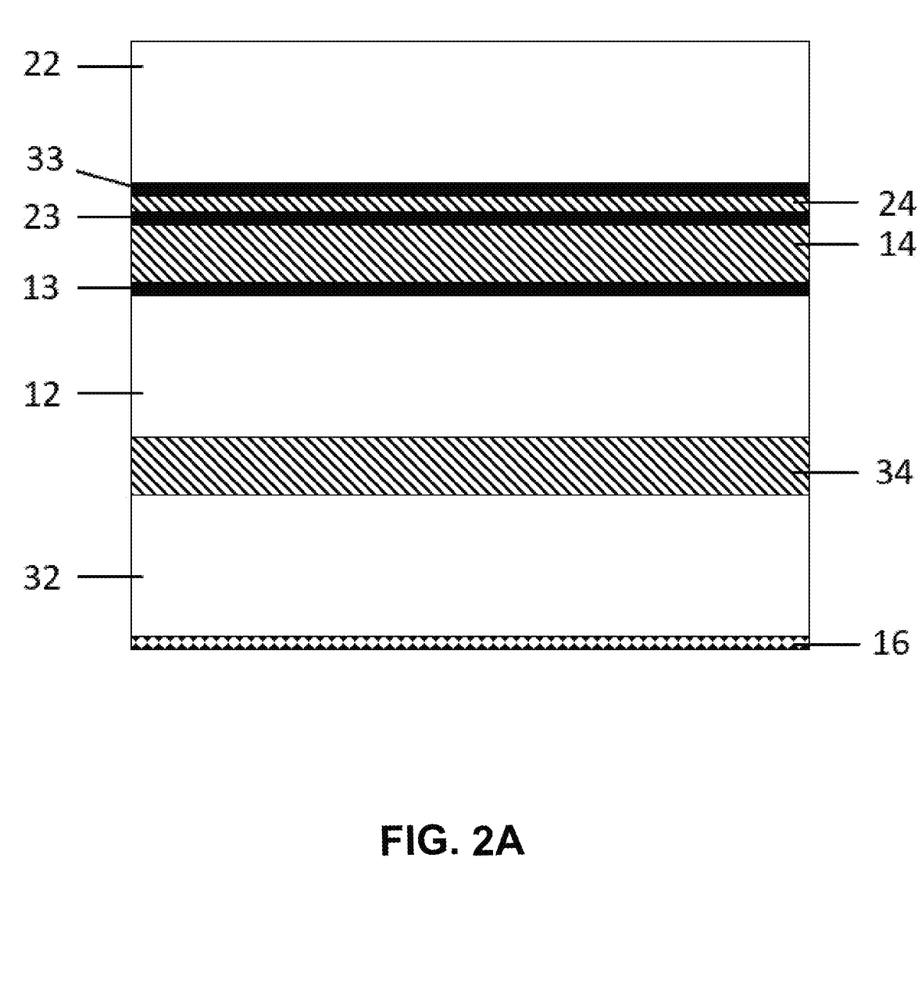
FIG. 2A schematically represents a first sequence of layers of barrier films used in window spacers according to embodiments of the present disclosure.
Figure 2B:
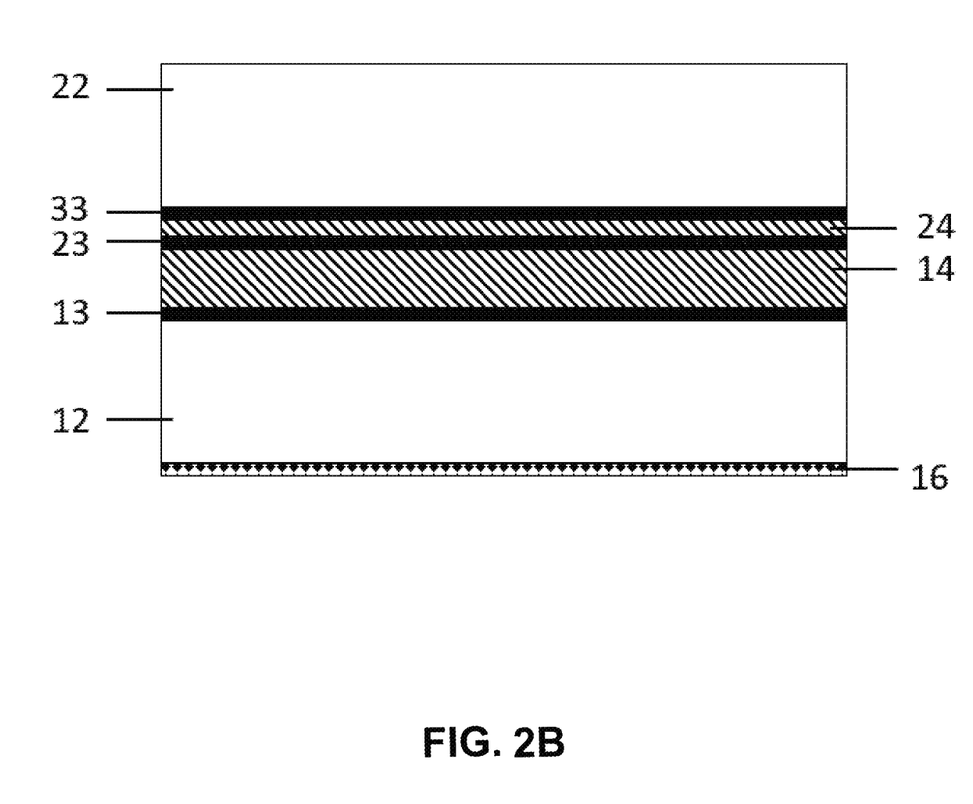
FIG. 2B schematically represents a second sequence of layers of barrier films used in window spacers according to embodiments of the present disclosure FIG. 2C schematically represents a third sequence of layers of barrier films used in window spacers according to embodiments of the present disclosure FIG. 2D schematically represents a fourth sequence of layers of barrier films used in window spacers according to embodiments of the present disclosure FIG. 3 schematically represents a picture of a tensile tester designed to elongate materials by stretching.
Figure 2C:
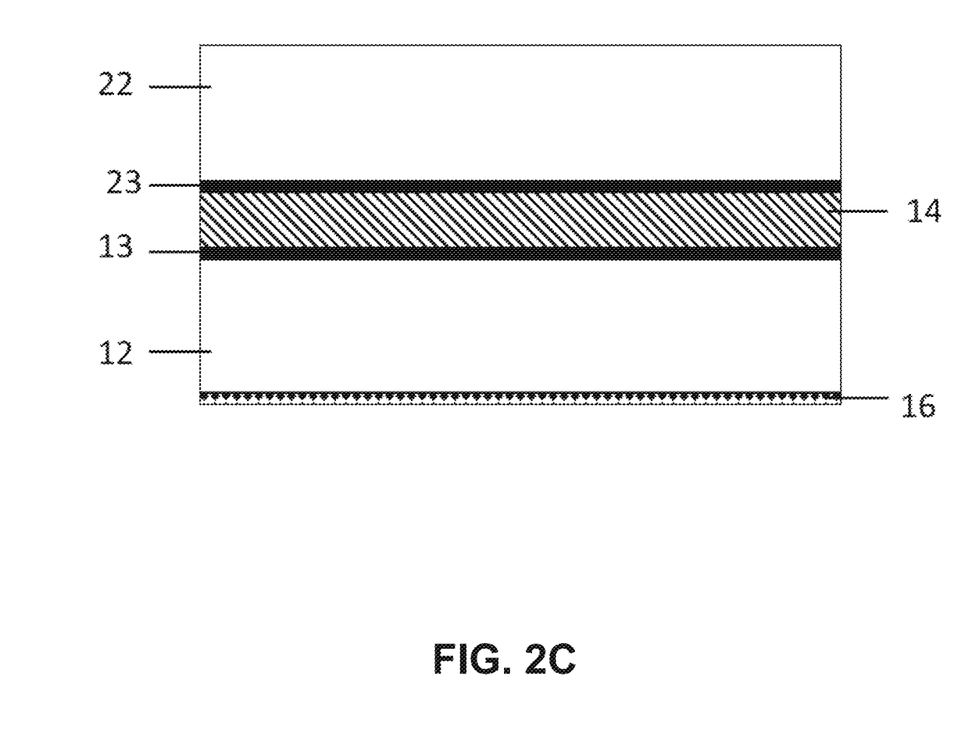

An illustrative example of such a barrier film used in a window spacer of the present disclosure is shown in FIG. 2C.

Advantageously, the multilayer barrier film (6) is in contact with part of the pane contact surfaces (2,3). More advantageously, the multilayer barrier film (6) is in contact with around one third ($\frac{1}{3}^{rd}$) of the pane contact surfaces (2,3), i.e. with around $\frac{1}{3}^{rd}$ of the way up the sides of the spacer, as schematically illustrated in FIGS. 1A and 1B.

Referring to FIGS. 1A and 1B, the pane contact surfaces (2,3) of the spacer are directed (or oriented) towards the window (or glazing) panes (7,8).

The adhesive surface (4) of the spacer is the bottom surface of the spacer arranged or oriented towards the bottom window frame (9).

The glazing interior surface (5) of the spacer is the upper surface of the spacer facing the interior (or intermediate) space (10) between the glazing panes.

Advantageously, the multilayer barrier film comprises at least three inorganic layers (13,23,33), said inorganic layers being separated by a second polymeric layer (24). An illustrative example of such a barrier film used in a window spacer of the present disclosure is shown in FIG. 2B.

Throughout the description, inorganic barrier layers (13, 23,33) are also referred to as inorganic layers.

Figure 2D:
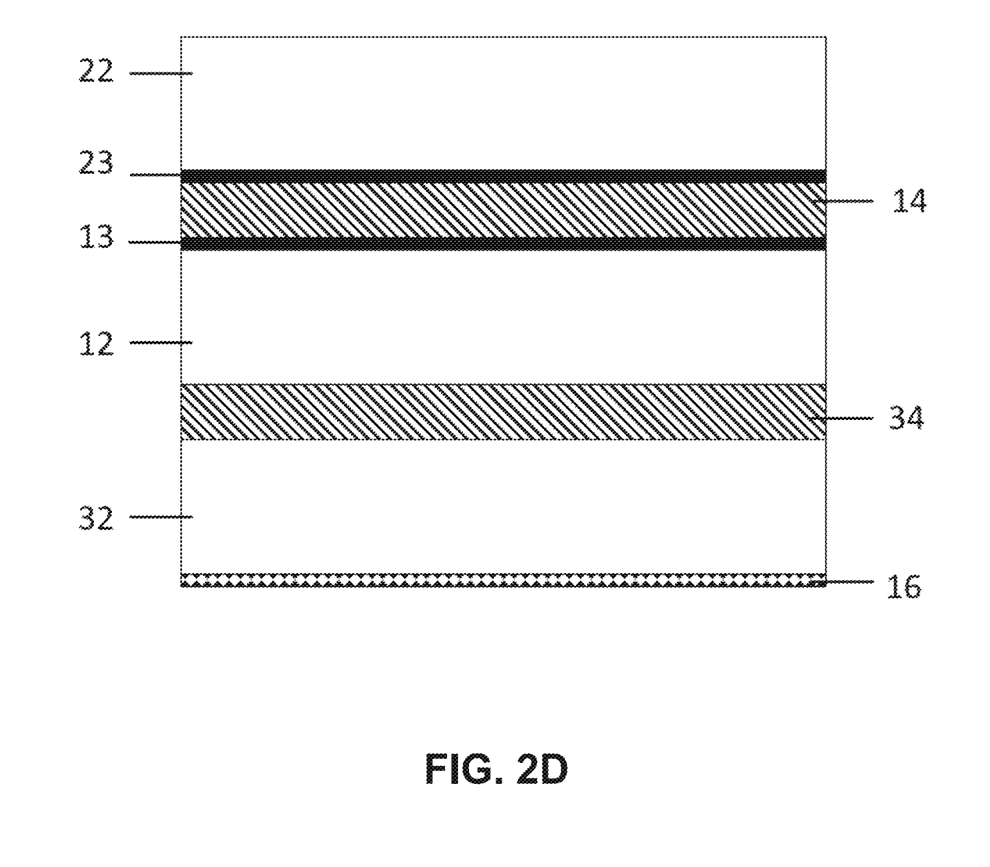

Advantageously, the multilayer barrier film comprises at least three first polymeric layers (12,22,32). An illustrative example of such a barrier film used in a window spacer of the present disclosure is shown in FIGS. 2A and 2D.

Advantageously, the inorganic layers are sandwiched between two of the first polymeric layers.

Advantageously, a second polymeric layer (34) is sandwiched between two of the first polymeric layers. This is illustrated as an example in FIGS. 2A and 2D.

In the barrier film used in the window spacer of the present disclosure, the inorganic barrier layers are separated by a thin, second polymeric layer, i.e. in the barrier film, the at least two inorganic barrier layers and the second polymeric layers alternate.

Advantageously, the (thin) second polymeric layers have planarization properties and/or barrier properties (i.e. barrier properties against oxygen, gases and moisture).

Through alternation of inorganic barrier layers with such thin polymeric layers in aspects of the present disclosure, the inorganic barrier layers are in close proximity. Due to this close proximity of inorganic barrier layers, the barrier film provides enhanced barrier performance and insulation properties, compared to barrier films used in spacers in the art.

Indeed, spacers used in the art generally have (inorganic) barrier layers applied to separate polymer films. In such arrangements of layers, the barrier layers are separated by polymer layers with a thickness of at least 5 µm. Due to this separation, the barrier properties of the barrier films used in spacers in the art are reduced.

Advantageously, the spacer substrate is a glass fiber reinforced, unreinforced, transparent, or foamed (foam-based) spacer substrate, advantageously a glass fiber reinforced or foamed (foam-based) spacer substrate.

Advantageously, the first polymeric layer has a thickness higher than 8 µm.

Advantageously, the first polymeric layer comprises one or more (co)polymers selected from the group consisting of oriented polyethylene terephtalate (oPET), oriented polypropylene (oPP), oriented polyamide (oPA), high-density polyethylene (HDPE), cyclic olefin copolymer (COC), polyethylene naphthalate (PEN), cyclic olefin polymer (COP), and polyethylene furanoate (PEF).

More advantageously, the first polymeric layer comprises up to 25% of nanoclay (such as montmorillonite, bentonite, kaolinite, hectorite, or halloysite). Alternatively, nanoclay can be nano-coated onto the first polymeric layer.

Advantageously, the second polymeric layer is an adhesive layer, or a barrier layer (a barrier layer referring here to a polymeric layer having some barrier properties against gas, oxygen and moisture).

More advantageously, the second polymeric layer is a thermoplastic or thermosetting layer.

More particularly, the second polymeric layer is an adhesive layer comprising one or more (co)polymers selected from the group consisting of polyurethane, polyurethane comprising nanoclay, fluorinated polyurethane (such as fluorinated polyurethane elastomer), poly(meth)acrylate, polyvinyl butyral (PVB), polybutylene, polyvinylchloride (PVC), polyvinylfluoride (PVF), polyester, and epoxy resins. The epoxy resins can be reacted with e.g. polyamines or polyacids. The adhesive can further comprise one or more tackifiers, one or more wetting agents, one or more plasticizers, one or more antioxidants, one or more antifoaming agents and/or one or more rheology modifiers.

Alternatively, the second polymeric layer can be a barrier layer (against oxygen, moisture and gas), said barrier layer comprising one or more (co)polymers selected from the group consisting of poly(ethylene vinyl alcohol) (EVOH), polyvinyl alcohol (PVOH), polysiloxane ormocer, polyurethane, and fluorinated polyurethane (such as fluorinated polyurethane elastomer).

Advantageously, the inorganic layer comprises (or consists of) a metal layer, advantageously aluminium or the inorganic layer comprises (or consists of) a ceramic layer, advantageously AlOx or SiOx, advantageously SiOx.

More advantageously, the inorganic layer is applied through vapour deposition.

Advantageously, the inorganic layer has a thickness comprised between 10 nm and 400 nm, advantageously between 10 nm and 200 nm, more advantageously between 30 nm and 100 nm, most advantageously between 20 nm and 100 nm.

Advantageously, the multilayer barrier film comprises a primer layer (16). The primer layer (16) is shown in FIG. 2A to 2D.

Advantageously, the primer can be applied to the barrier film through coating of a compatibilising polymer such as ethylene acrylic acid (EAA), ethyl methacrylate (EMA), ethylene butyl acrylate copolymer (EBA), ethylene-vinyl acetate copolymer (EVA), or by treatment through corona discharge, plasma discharge, flame treatment, or chemical modification through etching. The coating can for example be performed by liquid coating or by the application of lacquer. Alternatively, the coating can be performed by extrusion coating. Advantageously, the coating is performed by liquid coating.

More advantageously, the primer layer positioned on the barrier film comprises one or more (co)polymers selected from the group consisting of (poly)silane, polyurethane, poly(meth)acrylate, polyvinylidene chloride (PVdC), polyvinylchloride (PVC), and epoxy resin.

Through the coating with an organic primer layer, a corrosion resistant, adhesion promoting surface of the barrier film is achieved. Moreover, through the organic primer, an enhanced adhesion surface on the barrier film is obtained, compared to barrier films used in spacers in the art, the latter typically using metallised, and hence corrosion-sensitive layers as adhesion surface.

The enhanced adhesion surface of the barrier film used in spacers of the present disclosure can be further used to give adhesion to window construction encapsulants.

Advantageously, in the present disclosure, an encapsulant (or encapsulant adhesive) (11) is bonded to the barrier film of the window spacer via the (organic) primer layer (positioned) on the barrier film.

An encapsulant (or sealant), in addition to the use of a spacer, seals the window; more particularly, it seals the window spacer to the window frame.

In the art, metallised layers are used in the barrier films in window spacers to promote adhesion to encapsulants. However, these metallised layers are subject to corrosion and adhesion failure during the life of the window, if exposed to moisture or other acidic or alkaline corrosion agents. The polymeric interface to the encapsulant in aspects of the present disclosure is more robust to moisture exposure, with a more robust adhesion to the spacer and conveying higher flexibility. Moreover, reduction in the number of metallized layers in aspects of the present disclosure reduces the thermal conductivity of the spacer, thereby enhancing insulation properties (i.e. reducing the amount of heat lost), compared to barrier films used in spacers in the art. A barrier window spacer with enhanced durability, more particularly, a window spacer with enhanced barrier performance and insulation properties is thus provided.

More advantageously, the encapsulant (11) is applied as an adhesive band at least partially on the pane contact surfaces of the spacer.

Advantageously, the encapsulant comprises (or consists of) butyl-containing polymers or copolymers, polysulfide, polyurethane, or silicone.

Advantageously, the barrier film (6) is applied to the adhesive surface (4) of the spacer. The barrier film (6) can for example be extrusion bonded onto the (adhesive surface (4) of the) spacer substrate (1) (in that case, no adhesive layer is used between the barrier film and the spacer substrate).

More advantageously, the (first polymeric layer of the) barrier film (6) is bonded on the adhesive surface (4) of the spacer substrate (1) via an adhesive (17), advantageously via a polyurethane adhesive, a pressure-sensitive adhesive (PSA), or a heat adhesive (or hot-melt, such as but not limited to polyolefins, ionomers, etc.).

Advantageously, the window spacer comprises a desiccant, including at least one of silica gels, molecular sieves, $CaCl_2$, $Na_2SO_4$, activated charcoal, silicates, bentonites, or zeolites.

Advantageously, the window spacer comprises a desiccant, including at least one of silica gels, molecular sieves, $CaCl_2$, $Na_2SO_4$, activated charcoal, silicates, bentonites, or zeolites.

More advantageously, in the barrier film (6) in a window spacer according to the present disclosure:
the first polymeric layer (12,22,32) is oPET or oPP;
the inorganic layer (13,23,33) is an aluminium (metal) layer or a SiOx layer; and
the second polymeric layer (14,24,34) is a poly(meth)acrylic based adhesive, an EVOH barrier layer, a polyvinyl alcohol (PVOH) barrier layer, polyurethane, or a polysiloxane ormocer barrier layer, more advantageously, the second polymeric layer (14,24,34) is a poly(meth)acrylic based adhesive or an EVOH barrier layer.

Most advantageously, in the barrier film (6) in a window spacer according to the present disclosure:
the first polymeric layer (12,22,32) is oPET;
the inorganic layer (13,23,33) is an aluminium (metal) layer; and
the second polymeric layer (14,24,34) is a poly(meth)acrylic based adhesive.

In the context of the present description, a poly(meth)acrylic based adhesive refers to an adhesive comprising one or more (co)polymers of poly(meth)acrylate.

Advantageously, the window spacer (or spacer or spacer bar) of aspects of the present disclosure is used in multiply-glazed windows. Said windows comprise (or consist of) at least two glazing panes. More advantageously, the glazing panes are arranged in parallel and are spaced apart by the spacer.

An intermediate space between the glazing panes (enclosed by the glazing interior surface of the spacer) is filled with inert gas, preferably with argon.

Using the spacer in multiply-glazed windows prevents egress of argon from the window spacer and ingress of water and air.

Examples

A. Elongation of Material

In each of the below-described examples of multilayer barrier films used in window spacers of the present disclosure, the following values are measured:

(a) the oxygen gas transmission rates (OTR) of a laminate of the barrier films according to the ASTM 3985-2005 standard, at 23° C. and 50% relative humidity before elongation (i.e. at 0% elongation of a sample of the laminate);

(b) the OTR of a laminate of the barrier film according to the ASTM 3985-2005 standard, at 23° C. and 50% relative humidity, after 6%, 8%, or 10% elongation of a sample of the laminate according to an internal Amcor method with the following principle of operation: Flat film samples are clamped into the diffusion cell, which is then purged of residual oxygen using an oxygen-free ($N_2$) carrier gas. The carrier gas is routed to the sensor until a stable zero has been established. Pure oxygen (99.9%) is then introduced into the outside chamber of the diffusion cell. Molecules of oxygen diffusing through the film to the inside chamber are conveyed to the sensor by the carrier gas.

The evaluation of the oxygen transmission rates is serving as a measure for the overall gas barrier properties of the barrier films used in the window spacers of the present disclosure.

An example of an elongation testing system is Zwick® tensile tester ZW2.5/TN1S apparatus n° 989/158 with
load cell: 1000 N
pull velocity: 100 mm/min
pulling angle: 0°
clamps width: 100 mm
sample width: 90 mm.

Figure 3:
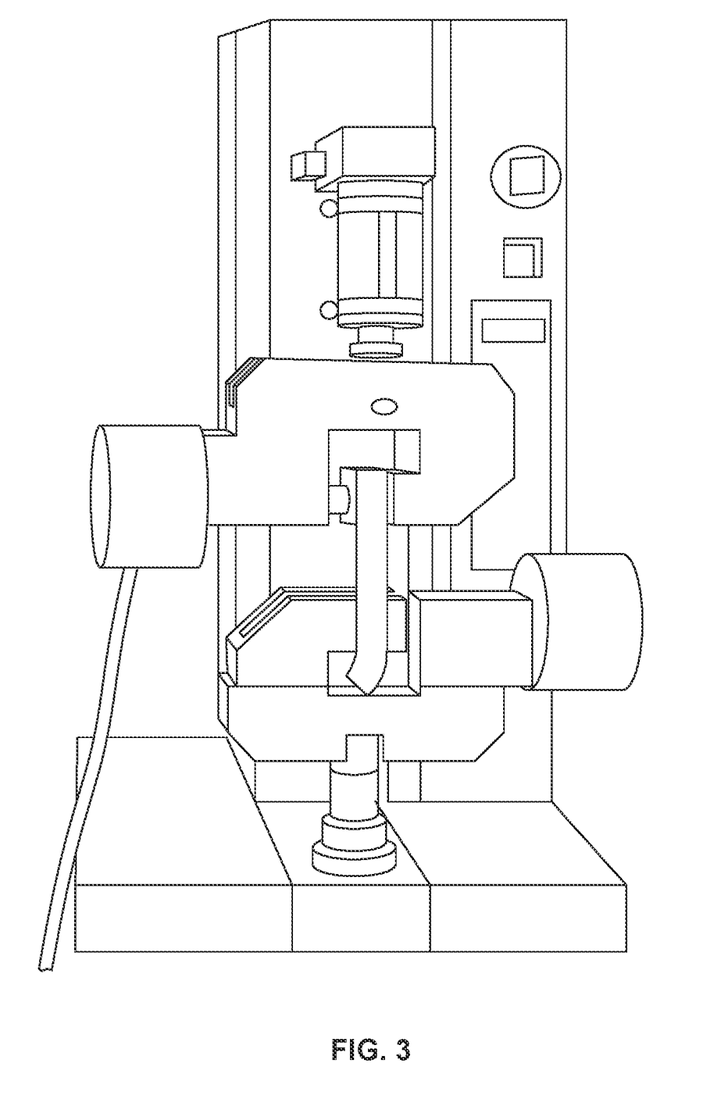

The elongation of the laminate of multilayer barrier films is performed using a Zwick® tensile tester as illustrated in FIG. 3. The tester has clamps of 100 mm. Sample cut prepared already for Mocon installation 80 mm×90 mm. The sample of barrier laminate is clamped and stretched with a speed of 100 mm/min. The elongation is stopped at requested elongation of 6%, 8%, or 10% via PC software for measuring the corresponding OTR of the sample.

An overview of the results of the measurements is given in Table 1.

The test materials in Examples 1 and 2 are prepared according to barrier films for use in window spacers according to the present disclosure.

The film OPET-SiOx-EVOH-M/adh/M-OPP/OPET coated in example 1 is prepared as follows: 12 μm OPET-30 nm SiOx-1.5 μm EVOH-30 nm M/adh 3 μm/30 nm M-OPP 12.5 μm/OPET coated with 60 nm primer.

Lamination in this example is typically done in two steps:
Step 1: OPET side of OPET-30 nm SiOx-1.5 μm EVOH-30 nm metallised aluminium is laminated to the aluminium metallised coated side of the OPP with a polyurethane adhesive;
Step 2: OPP side of M-OPP is laminated against OPET-side of coated OPET.

The film OPETP-EVOH-SiO$_x$/adh/M-OPP/adh/OPET coated in Example 2 is prepared as follows: 12 μm eOPET-1.5 μm EVOH-30 nm SiOx/3 μm adh/30 nm M-12.5 μm OPP/3 μm adh/12 μm OPET coated with 60 nm primer.

Lamination in this example is typically done in two steps:
Step 1: SiOx side of OPET-EVOH-SiOx is laminated to the aluminium metallised side of the M-OPP;
Step 2: OPP side is laminated to OPET.

From the present description and the examples, other multilayer barrier films for use in window spacers according to the present disclosure will be apparent for those skilled in the art.

In Example 3, a commercially-available barrier film OPET-M/adh/M-OPETP-M/adh/M-OPP/adh/OPET-M was analysed as comparative and is prepared as follows: 12 μm OPET-M/3 μm adh/M-OPETP 12 μm-M/3 μm adh/M-OPP 12.5 μm/3 μm adh/12 μm OPET-M.

Lamination in this example is typically done in three steps:
Step 1: metal side of OPET-M is laminated to the metal side of the M-OPETP-M;
Step 2: metal side of M-OPETP-M is laminated against metal side of M-OPP;
Step 3: OPP side laminated to OPET of OPET-M.

Suitable commercially-available barrier films will be apparent for those skilled in the art.

TABLE 1 measured OTR values at 0%, 6%, 8%, or 10% elongation

| Example No. | Structure | % Elongation | OTR cc/m$^2$/ day · atm (23° C. 50% RH) |
|---|---|---|---|
| 1 | OPET-SiOx-EVOH-M/adh/M-OPP/ OPETcoated | 0 | <0.001 |
|  |  | 6 | 0.01 |
|  |  | 8 | 0.05 |
|  |  | 10 | 0.8 |
| 2 | OPETP-EVOH-SiO$_x$/ adh/M-OPP/adh/ OPETcoated | 0 | <0.001 |
|  |  | 6 | 0.01 |
|  |  | 8 | 0.1 |
|  |  | 10 | 1.1 |
| 3 | OPET-M/adh/M-OPETP-M/adh/M-OPP/adh/OPET-M | 0 | <0.001 |
|  |  | 6 | 1.3 |
|  |  | 8 | 5.5 |
|  |  | 10 | 14 |

From comparative Example 3, it can be seen that the deterioration properties after elongation are significant and that the barrier film used in spacers in the art does not show good barrier properties.

The data for the films prepared according to the invention in Examples 1 and 2 shows that the oxygen barrier properties are excellent, even after being subjected to elongation.

The oxygen barrier properties of the films of the present invention are even substantially improved when compared to the barrier properties of the barrier films used in window spacers in the art.

From the above, it hence follows that the films used in the window spacers of the present invention will exhibit excellent, even enhanced, overall gas barrier properties (even after being subjected to elongation).

B. Flexing of Material

In the below-described example of a multilayer barrier film used in window spacers of the invention, the following values are measured:

(a) the OTR of a laminate of the barrier film according to the ASTM 3985-2005 standard, at 23° C. and 50% relative humidity before Gelbo flexing;

(b) the OTR of a laminate of the barrier film according to the ASTM 3985-2005 standard, at 23° C. and 50% relative humidity, after 50 times Gelbo flexing the laminate according to the ASTM F392-74 standard.

MOCON® OX-TRAN® Model 2/21 is an example of an OTR testing system for high barrier testing.

Figure 4:
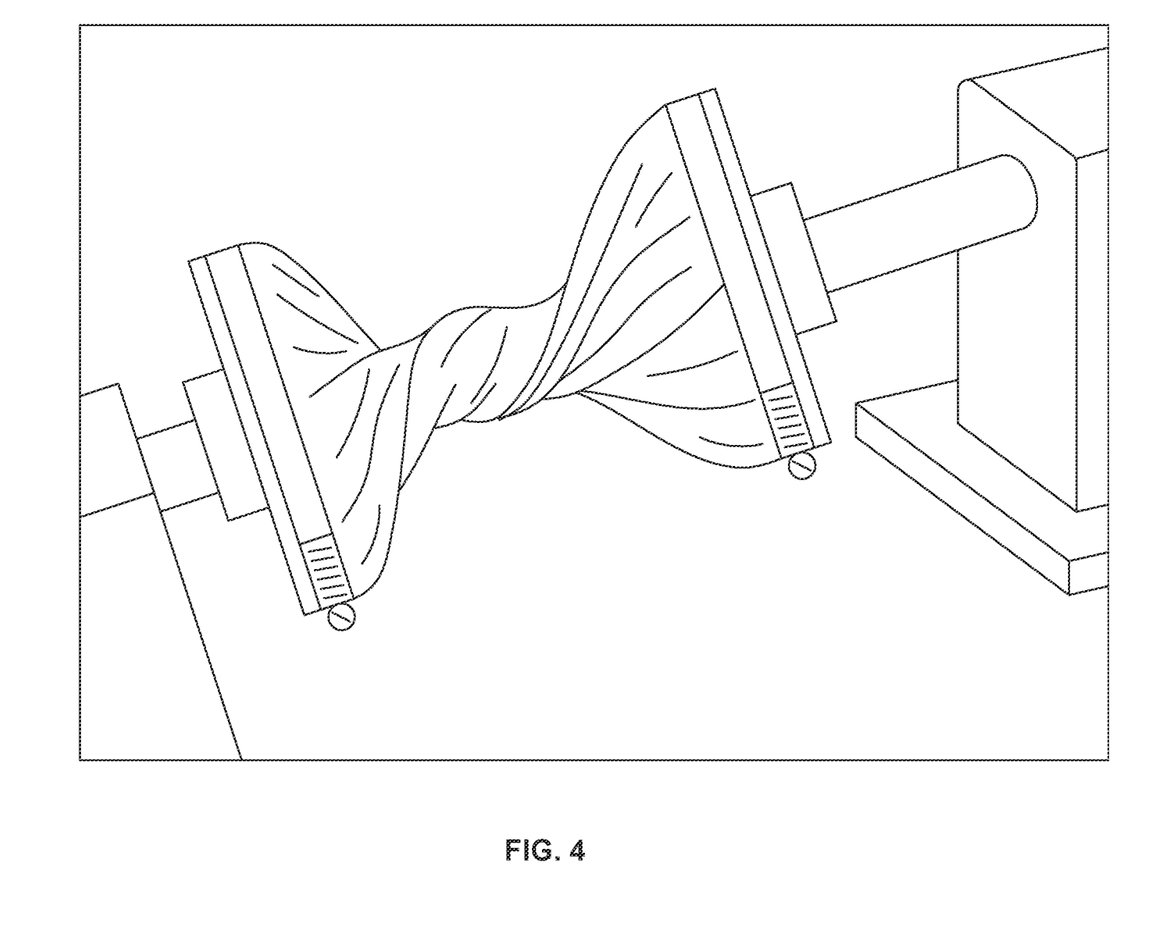
FIG. 4 schematically represents a picture of a Gelbo flex tester designed to determine the flex resistance of barrier materials by applying repetitive strain (i.e. twisting and horizontal motion).

The flexing of the laminate of the barrier films is performed using a Gelbo flex tester as illustrated in FIG. 4. Using the Gelbo flex tester determines the flex resistance of the barrier materials by applying repetitive strain. The flexing action consists of a twisting motion combined with a horizontal motion, repeatedly twisting and crushing the film. The frequency is at a rate of 45 cpm. Pin hole formation is the criteria for failure and pin holes are determined by use of coloured turpentine by allowing it to stain through the pin holes onto a white backing.

An overview of the results of the measurements is given in Table 2.

The film OPETP-M/adh/SiO$_x$-EVOH-OPET/adh/M-OPP/adh/OPET coated in Table 2 is prepared as described in Example 1 above.

A commercially-available barrier film OPET-M/adh/M-OPETP-M/adh/M-OPP/adh/OPET-M was analysed as comparative example, prepared as described in Example 3 above.

TABLE 2 measured OTR values before and after 50 times Gelbo flexing

| Example No. | Structure | Gelboflex Cycles | OTR cc/m²/ day · atm (23° C. 50% RH) |
|---|---|---|---|
| 1 | OPET-SiOx-EVOH-M/adh/ M-OPP/OPET coated | 0 50 | <0.001 0.02 |
| 2 | OPETP-EVOH-SiOx/adh/ M-OPP/adh/OPETcoated | 0 50 | <0.001 0.05 |
| 3 | OPET-M/adh/M-OPETP-M/ adh/M-OPP/adh/OPET-M | 0 50 | <0.001 1 |

The data for the film prepared according to the invention in Example 1 show that the oxygen barrier properties are excellent, even after Gelbo flexing. It hence follows that the film will exhibit excellent overall gas barrier properties, even after Gelbo flexing.

C. Adhesion of the Laminate to a Polysulfide Encapsulant
C1. Before Climate Chamber Ageing Polysulfide sealant (or encapsulant) is applied between two A4 sheets of laminate of a barrier film as used in window spacers of the present invention. The structure is cured in a press at 40° C. for 3 days, and the bond strength between polysulfide and the two sheets was measured.

An example of an elongation testing system is a Hounsfield tensile tester apparatus n° H5K-S with
  load cell: 1000 N
  pull velocity: 100 mm/min
  pulling angle: 90°
  sample width: 15 mm
  Length of pulling: 100 mm in 90° angle A Hounsfield tensile tester as illustrated in FIG. 3 was used. Each end of a film sample is held by a clamp or grip. One grip is stationary, while the other is pulled away from the first. The length of pulling is 100 mm in 90° angle. The tensile tester continuously measured the changing distance between the grips and the force exerted on them as they pull the film apart. The test is completed when the sample breaks.

In this example, the structure OPETP-primer/polysulfide/primer-OPETP is tested, using a barrier film coated with primer as used in window spacers of the present disclosure. The primer coated on the barrier film is oriented towards the polysulfide sealant. The sealant is thus bonded to the barrier film via the primer.

An OPETP-metal/polysulfide/metal-OPETP structure, using a laminate of metal coated barrier films as used in window spacers in the art, was analysed as well as a comparative example. In that case, the metal coated on the barrier film is oriented towards the polysulfide sealant. The sealant is thus bonded to the barrier film via the metal coating on the barrier film.

An overview of the results for the measurements of bond strength between polysulfide and the two sheets is given in Table 3.

TABLE 3 measured bond strength (in N/15 mm) between polysulfide and two sheets of material

| Bond strength Material-polysulfide (N/15 mm) | Max. values | Average | Remarks |
|---|---|---|---|
| OPETP-primer | 4.7 4.4 | 4.4 4.1 | Separates in polysulfide layer |
| OPETP-metal | 4.9 5.4 | 4.8 4.8 | Separates in polysulfide layer |

From the results in Table 3, it can be seen that the adhesion of the primer to the polysulfide sealant is excellent. When delaminating an OPETP-primer/polysulfide/primer-OPETP laminate, the structure separates in the polysulfide layer with a bond strength of more than 4 N/15 mm, with no failure at the OPETP-primer/polysulfide interface itself.

Furthermore, from Table 3, it can be seen that the OPETP-metal bond strength with polysulfide is comparable to the level of the primer coated barrier.

When delaminating an OPETP-metal/polysulfide/metal-OPETP laminate, the structure separates in the polysulfide layer with a bond strength of more than 4 N/15 mm, with no failure at the OPETP-metal/polysulfide interface itself. Overall, no significant difference is identified.

C2. After Climate Chamber Ageing of the Laminate

Ageing conditions of 85% RH (relative humidity) and 85° C. were applied during 4 weeks.

Inspection of the visual appearance and the bond strength were done after the ageing.

It was impossible to separate the layers of the laminate by means of an adhesive tape method. The force needed to separate the tape from the laminate is on average about 1.9 N/15 mm.

When applying a solvent to initiate a delamination, delamination between OPET SiOx EVOH M/M and OPP was observed in case of Example 1.

From the description and examples above, it follows that window spacers comprising a barrier film are provided, said film being able to maintain its oxygen barrier properties even after submission of a laminate of the film to mechanical constraints such as elongation, folding or flexing.

The present disclosure thus provides window spacers exhibiting excellent or enhanced gas barrier properties (advantageously exhibiting excellent or enhanced gas and moisture barrier properties), having improved insulation properties and having better resistance to flex-cracking and elongation, compared to spacers used in the art.

Hence, even exposing the barrier film to high mechanical stresses during the assembly of glazing panes, window frame and spacers will not reduce the barrier effect of the barrier film applied to the adhesive surface of the spacer (contrary to using spacers known in the art).

The invention claimed is:
1. A window spacer, comprising:
  a spacer substrate comprising two pane contact surfaces, an adhesive surface, and a glazing interior surface;
  a multilayer barrier film being in contact with the adhesive surface of the spacer substrate, wherein the multilayer barrier film comprises:
    at least two first polymeric layers; and
    at least two inorganic layers the inorganic layers being separated by a second polymeric layer, the at least two inorganic layers each having a thickness comprised between 10 nm and 400 nm and the second polymeric layer having a thickness lower than 5 μm.

2. The window spacer according to claim 1, wherein the multilayer barrier film comprises at least three inorganic layers the inorganic layers being separated by a second polymeric layer.

3. The window spacer according to claim 1, wherein the multilayer barrier film comprises at least three first polymeric layers.

4. The window spacer according to claim 3, wherein a second polymeric layer is sandwiched between two of the first polymeric layers.

5. The window spacer according to claim 1, wherein the inorganic layers are sandwiched between two of the first polymeric layers.

6. The window spacer according to claim 1, wherein each of the first polymeric layers comprises one or more (co)polymers selected from the group consisting of oriented polyethylene terephtalate (oPET), oriented olypropylene (oPP), oriented polyamide (oPA), high-density polyethylene (HDPE), cyclic olefin copolymer (COC), polyethylene naphthalate (PEN), cyclic olefin polymer (COP), and polyethylene furanoate (PEF).

7. The window spacer according to claim 1, wherein each of the first polymeric layers comprises nanoclay.

8. The window spacer according to claim 1, wherein the second polymeric layer is an adhesive layer or a barrier layer.

9. The window spacer according to claim 8, wherein the second polymeric layer is an adhesive layer comprising one or more (co)polymers selected from the group consisting of polyurethane, polyurethane comprising nanoclay, fluorinated polyurethane, poly(meth)acrylate, polyvinyl butyral (PVB), polybutylene, polyvinylchloride (PVC), polyvinylfluoride (PVF), polyester, and epoxy resins.

10. The window spacer according to claim 8, wherein the second polymeric layer is a barrier layer comprising one or more (co)polymers selected from the group consisting of poly(ethylene vinyl alcohol) (EVOH), polyvinyl alcohol (PVOH), polysiloxane ormocer, polyurethane, and fluorinated polyurethane.

11. The window spacer according to claim 1, wherein the spacer substrate is a glass fiber reinforced or foamed spacer substrate.

12. The window spacer according to claim 1, wherein each of the inorganic layers comprises a metal layer or a ceramic layer.

13. The window spacer according to claim 1, wherein the multilayer barrier film comprises a primer layer.

14. The window spacer according to claim 13, wherein the primer layer positioned on the barrier film comprises one or more (co)polymers selected from the group consisting of (poly)silane, polyurethane, poly(meth)acrylate, polyvinylidene chloride (PVdC), polyvinylchloride (PVC), and epoxy resin.

15. The window spacer according to claim 13, wherein an encapsulant is bonded to the barrier film via the primer layer positioned on the barrier film.

16. The window spacer according to claim 15, wherein the encapsulant comprises butyl-containing polymers or copolymers, polysulfide, polyurethane, or silicone.

17. The window spacer according to claim 1, wherein an encapsulant is applied as an adhesive band at least partially on the pane contact surfaces of the spacer.

18. The window spacer according to claim 1, wherein the multilayer barrier film is bonded on the adhesive surface of the spacer substrate via a polyurethane adhesive, a pressure-sensitive adhesive (PSA), or a heat adhesive.

19. The window spacer according to claim 1, wherein in the multilayer barrier film:
   each of the first polymeric layers is oPET or oPP;
   each of the inorganic layers is an aluminium layer or a SiOx layer; and
   the second polymeric layer is a poly(meth)acrylic based adhesive, an EVOH barrier layer, a PVOH barrier layer, polyurethane, or a polysiloxane ormocer barrier layer.

20. The window spacer according to claim 1, wherein in the multilayer barrier film:
   each of the first polymeric layers is oPET;
   each of the inorganic layers is an aluminium layer; and
   the second polymeric layer is a poly(meth)acrylic based adhesive.

* * * * *

UNITED STATES PATENT AND TRADEMARK OFFICE
CERTIFICATE OF CORRECTION

PATENT NO. : 11,391,084 B2
APPLICATION NO. : 16/959597
DATED : July 19, 2022
INVENTOR(S) : Peter Ettridge, Paul Schlemmer and Galina Ourieva It is certified that error appears in the above-identified patent and that said Letters Patent is hereby corrected as shown below:

In the Specification

Column 7, Line 66: Delete "CaCl2)" and insert -- CaCl2 --, therefor.

In the Claims

Column 13, Claim 6, Line 17: Delete "olypropylene" and insert -- polypropylene --, therefor.

Signed and Sealed this
Eighteenth Day of July, 2023

Katherine Kelly Vidal
*Director of the United States Patent and Trademark Office*